United States Patent [19]

Kobayashi et al.

[11] Patent Number: 4,858,049
[45] Date of Patent: Aug. 15, 1989

[54] MAGNETIC FILM AND MAGNETIC HEAD USING THE SAME

[75] Inventors: Toshio Kobayashi, Tokyo; Shigekazu Otomo, Sayama; Ryoichi Nakatani, Akikawa; Noriyuki Kumasaka, Ome, all of Japan

[73] Assignee: Hitachi, Ltd., Tokyo, Japan

[21] Appl. No.: 56,114

[22] Filed: Jun. 1, 1987

[30] Foreign Application Priority Data

May 30, 1986 [JP] Japan .................... 61-123323
Sep. 5, 1986 [JP] Japan .................... 61-207871

[51] Int. Cl.⁴ .............................................. G11B 5/12
[52] U.S. Cl. ...................................... 360/126; 360/125
[58] Field of Search ......................... 360/113, 125–126

[56] References Cited

U.S. PATENT DOCUMENTS

| | | | |
|---|---|---|---|
| 4,351,010 | 9/1982 | Arai | 360/131 |
| 4,677,512 | 6/1987 | Akiyama et al. | 360/110 |
| 4,772,976 | 9/1988 | Otomo et al. | 360/125 |

FOREIGN PATENT DOCUMENTS

| | | | |
|---|---|---|---|
| 0174144 | 3/1986 | European Pat. Off. | |
| 58-88812 | 5/1983 | Japan | 360/113 |
| 128605 | 7/1985 | Japan. | |

Primary Examiner—John H. Wolff
Attorney, Agent, or Firm—Antonelli, Terry & Wands

[57] ABSTRACT

A magnetic film and a magnetic head using the magnetic film are disclosed. The magnetic film is formed by adding one or more elements by 5 to 20 at. %, the elements being selected from B, N, C and P interstitially soluble to Fe to a magnetic film made of Fe or having Fe as its main component.

28 Claims, 2 Drawing Sheets

MAGNETIC FILM AND MAGNETIC HEAD USING THE SAME

BACKGROUND OF THE INVENTION

The present invention relates to a magnetic film and a magnetic head using the same, and more particularly to a magnetic film for the magnetic pole of a magnetic head and a magnetic head using the same, particularly suitable for high density magnetic recording.

As a material for a magnetic pole of a magnetic head for high density magnetic recording, an alloy whose main component is Fe, Co and Ni and whose saturation magnetic flux density is no less than 10 KG, and an Fe-Si alloy having a saturation magnetic flux density no less than 18 KG have been developed (JP-A-59-182938). It is necessary for the tip of a magnetic pole of a magnetic head to have a thickness no larger than 0.5 micron if high density magnetic recording is intended, which requires a steeply distributed magnetic field of the magnetic pole. Since the magnetic flux density at the tip becomes high, a magnetic film with high saturation magnetic flux density, high permeability and low coercivity becomes necessary. In addition, since the film thickness at the tip is small, magnetic saturation may occur. Thus, for a film thickness no larger than 0.5 micron, a high saturation magnetic flux density no less than 15 KG, high relative permeability no less than 1000 and low coercivity no larger than 1 Oe become necessary.

A magnetic film has been formed by the RF sputtering method or the like. The magnetic characteristic of a magnetic film containing Fe as its main component exhibits a high saturation magnetic flux density no less than 15 KG. However, its relative permeability exhibits a low value no larger than 700. Thus, it has been difficult to form a magnetic film having both high saturation magnetic flux and high relative permeability.

Recently, as a magnetic film having high saturation magnetic flux density and high relative permeability, a multilayered magnetic film with magnetic films laminated between intermediate layers has been studied (JP-A-59-9905). The magnetic characteristic of a multilayered magnetic film changes depending upon the material of intermediate layers between main magnetic films. Generally, it is preferable to use magnetic material having high permeability.

According to a prior art technique, a magnetic film for the pole of a magnetic head is formed by the RF sputtering method or the like. Such a magnetic film has a fairly high saturation magnetic flux density, but its relative permeability is low. Thus, it cannot be used as a magnetic film for a magnetic head for high density magnetic recording.

SUMMARY OF THE INVENTION

It is an object of the present invention to eliminate the above-described prior art problems and provide a magnetic film having both high saturation magnetic flux density and high relative permeability.

It is a further object to provide a magnetic film suitable for use in a magnetic pole of a perpendicular or longitudinal magnetic recording head which exhibits an excellent recording and reproducing characteristic for a high coercivity and high density magnetic recording medium, and to provide a magnetic head having such a magnetic film.

The main feature of the present invention resides in the addition of an element interstitially soluble to Fe to a magnetic film having Fe as its main component and having a high saturation magnetic flux density. By adding such an element, only a portion of crystallites is made amorphous so that the magnetocrystalline anisotropy energy is decreased, resulting in a decrease in coercivity and an increase in relative permeability to thereby obtain a saturation magnetic flux density no less than 15 KG and a relative permeability no less than 1000.

It is preferable to use one or more elements selected from B, N, C and P interstitially soluble to Fe, as the elements to be added to the magnetic film of this invention. A multilayered magnetic film constructed of such magnetic films laminated between Ni-Fe alloy layers of high permeability material or amorphous magnetic alloy layers enables to considerably increase the relative permeability.

The present inventors have extensively studied conventional magnetic films and found that if a magnetic film having Fe as its main component and having a high saturation magnetic flux density is added with a second or third element in order to reduce coercivity and improve corrosion resistance, the magnetic moment is diluted to decrease saturation magnetic flux density. The inventors examined the film structure of such a magnetic film by the X-ray diffraction method and a transmission electron microscopy and confirmed that a strong (110) diffraction peak of Fe appears as a main diffraction peak of the magnetic film and that the magnetic film is made of columnar crystallites having a diameter of about 300 to 500 angstroms. In the course of the study, the inventors become aware that a magnetic film having Fe as its main component and added with an element interstitially soluble to Fe can have a reduced coercivity and hence an increased relative permeability without decreasing saturation magnetic flux density. By observing such a magnetic film by the X-ray diffraction method and a transmission electron microscopy, the inventors found that the magnetic film has a different film structure from that of a conventional one made of Fe or having Fe as its main component. In particular, an X-ray diffraction peak of the magnetic film becomes extremely broad and the film is more or less amorphous as compared with the conventional film. The magnetic film was observed using a transmission electron microscopy, and it was found that the grain boundary is indefinite and a number of moire images caused by distortion of crystallites are observed, which is different from the conventional magnetic film. Although measuring a diameter accordingly becomes difficult, the inventors measured it based on the contrast present to a small degree at the grain boundary and found that the crystallite diameter is about 300 to 500 angstroms which is no larger than that of the conventional magnetic film. With the above results, the inventors found that if a magnetic film having Fe as its main component contains an amorphous portion, the coercivity is reduced and the relative permeability is increased while maintaining a high saturation magnetic flux density, and that this can be achieved by adding an element interstitially soluble to Fe. The reason why the coercivity is reduced and the relative permeability is increased by containing the amorphous portion is not certain. However, the inventors imagine that this is caused by a decrease in magnetocrystalline anisotropy energy due to the amorphous portion of the magnetic film and by a decrease in dispersion of magnetic anisotropy due to fine crystallites. Further, the reason why a high saturation magnetic flux density is maintained is not clear. However, it can be imagined that if a different element is added into Fe lattices in interstitially soluble form, the magnetic moment of Fe is not diluted by the element.

DESCRIPTION OF THE PREFERRED EMBODIMENTS

Figure 1:
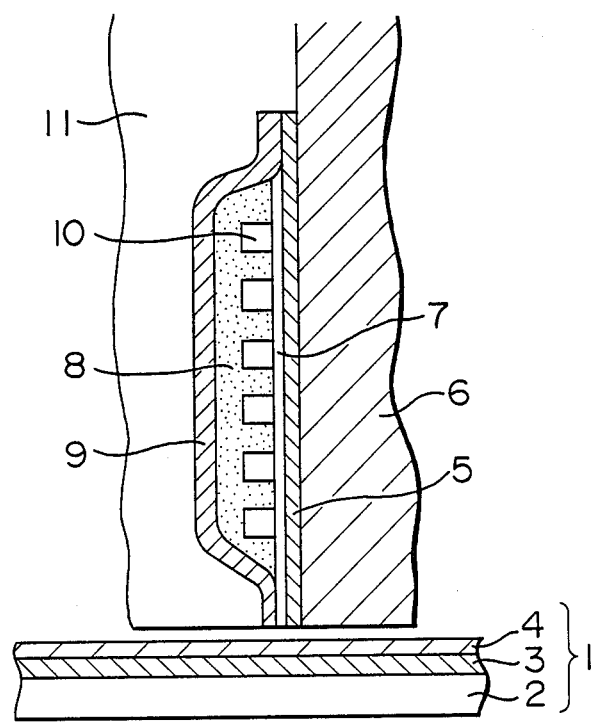
FIG. 1 is a cross section showing an embodiment of a magnetic head using a magnetic film according to the present invention.

The present invention will be described in detail in connection with Examples.

EXAMPLE 1

An Fe containing magnetic film was formed using an RF sputtering apparatus. An Fe plate of 99.99% purity was used as a target on which graphite chips were placed. The composition of Fe and C was controlled by the number of graphite chips. The relatively good sputtering conditions selected were:

| | |
|---|---|
| RF power density | 2.4 W/cm$^2$ |
| Argon pressure | 9 × 10$^{-3}$ Torr |
| Substrate temperature | 250° C. |
| Distance between electrodes | 45 mm |

The C content added to the Fe-C magnetic film obtained by the above conditions was measured by an Auger electron spectroscopy. The magnetic characteristics of the magnetic film were measured; the saturation magnetic flux density by a vibrating sample magnetometer and the magnetostriction constant by a torquemeter. The corrosion test was carried out by spraying 1% NaCl aqueous solution and under temperature of 30° C. The test results are shown using a time required for the saturation magnetic flux density to reduce by 5%.

The above measurement results are shown in Table 1.

TABLE 1

| No. | Additive | Content (at. %) | Saturation magnetic flux density (KG) | Magneto-friction constant | corrosion test results (hr) |
|---|---|---|---|---|---|
| 1 | C | 0 | 21.9 | −5.6 × 10$^{-6}$ | 125 |
| 2 | " | 1 | 21.8 | −4.0 × 10$^{-6}$ | 112 |
| 3 | " | 2.5 | 21.8 | −3.2 × 10$^{-6}$ | 105 |
| 4 | " | 5 | 21.5 | −1.9 × 10$^{-6}$ | 153 |
| 5 | " | 10 | 20.9 | −0.7 × 10$^{-6}$ | 170 |
| 6 | " | 15 | 21.2 | 0.6 × 10$^{-6}$ | 168 |
| 7 | " | 20 | 20.8 | 1.4 × 10$^{-6}$ | 157 |
| 8 | " | 25 | 20.6 | 2.0 × 10$^{-6}$ | 152 |
| 9 | " | 30 | 19.7 | 3.3 × 10$^{-6}$ | 163 |
| 10 | " | 40 | 19.3 | 3.9 × 10$^{-6}$ | 175 |

As seen from Table 1, with the addition of C, the magnetostriction constant changed greatly, but the saturation magnetic flux density scarcely changed. A large decrease of the saturation magnetic flux density as seen in the conventional magnetic film was not observed. The magnetostriction constant changes from negative to positive as the additive concentration increases. The additive concentration was found to be 5 to 20 wt. % for the magnetostriction constant $-2\times10^{-6}$ to $2\times10^{-6}$ suitable for the recording head core material.

The corrosion resistance test results showed an extensively improved life time longer than 100 hours for all the magnetic films, as compared with 20 to 30 hours for the conventional magnetic film added with Si or the like. The magnetic film having Fe as its main component may be added with an impurity other than C. In this case, the additive concentration is preferably less than 5 at. %. As the impurity concentration increases, not only the saturation magnetic flux density may be decreased, but also the corrosion resistance may be degraded considerably.

EXAMPLE 2

An Fe-C type target used in Example 1 was held by one of the target holders of an RF sputtering apparatus having rotary target holders. An Ni-19 wt. % Fe target or a Co-7 wt. % Zr target was held by another target holder. Under the sputtering conditions same as Example 1, a multilayered magnetic film was formed using as a main magnetic film the Fe-C type magnetic film of 100 nm and as an intermediate layer the Ni-19 wt. % Fe film or the Co-7 wt. %. Zr film of 5 nm, and sequentially laminating them into 9 layers. The magnetic characteristics of the obtained multilayered magnetic films are shown in Table 2.

TABLE 2

| No. | Main magnetic film | Intermediate layer | Saturation magnetic flux density (KG) | Coercivity (Oe) |
|---|---|---|---|---|
| 1 | Fe - 7.5 at % C | Ni - 19 wt. % Fe | 21.3 | 0.6 |
| 2 | " | Co - 7 wt. % Zr | 21.5 | 0.4 |
| 3 | Fe - 10 at % C | Ni - 19 wt. % Fe | 21.2 | 0.5 |
| 4 | " | Co - 7 wt. % Zr | 21.0 | 0.4 |
| 5 | Fe - 12.5 at % C | Ni - 19 wt. % Fe | 20.7 | 0.3 |
| 6 | " | Co - 7 wt. % Zr | 20.5 | 0.3 |
| 7 | Fe - 20 at % C | Ni - 19 wt. % Fe | 20.3 | 0.5 |
| 8 | " | Co - 7 wt. % Zr | 20.2 | 0.4 |

As seen from Table 2, the saturation magnetic flux density is no lower than 20 KG for all the films, which is far apart from 14 to 17 KG of the conventional multilayered magnetic film. The coercivity of the multilayered film is no higher than 0.6 Oe. Thus, the coercitivy 2 to 5 Oe of a single layer magnetic film is reduced.

The above-described single layer film or multilayered film was used for the main magnetic pole of a perpendicular magnetic recording head which is shown in FIG. 1.

A magnetic recording medium 1 is constructed of a non-magnetic substrate 2, a base film 3 such as permalloy formed on the substrate 2, and a perpendicularly magnetizable film 4 such as Co-Cr formed on the base film 3 and having an easily-magnetizable axis perpendicular to its film 4. A magnetic head is constructed of a main magnetic pole 5 formed on a substrate 6, a gap limiting material 7, an auxiliary magnetic pole 9, a coil 10, a packing member 8 made of insulating material, and a protective film 11 formed on the auxiliary magnetic pole 9. The main magnetic pole 5 is magnetized by a signal current passing through the coil 10 to generate a perpendicular magnetic field at the tip of the pole and record the signal in the perpendicularly magnetizable film 4 of the magnetic recording medium 1.

With the magnetic head using the magnetic film of this invention, a recording density no less than 100 KBPI (kilobit/inch) was obtained which is larger than 80 KBPI of the conventional magnetic film.

EXAMPLE 3

A magnetic film having Fe as its main component was formed by the ion beam sputtering method. The ion beam sputtering apparatus used in Example 3 was a dual ion beam apparatus of the type that two ion guns are provided wherein one ion gun performs sputtering of a target to deposit sputter particles on the substrate, and the other ion gun can directly radiate ion to the substrate, typically at low accleration energy no larger than 500 V, and control the structure of a film to be deposited.

The sputtering conditions for forming a magnetic film having high saturation magnetic flux density, high relative permeability and low coercivity were studied and selected as in the following:

| | |
|---|---|
| 1st ion gun acceleration voltage | 1000 to 1400 V |
| 1st ion gun ion current | 100 to 120 mA |
| 2nd ion gun acceleration voltage | 200 to 400 V |
| 2nd ion gun ion current | 30 to 60 mA |
| Ar pressure | 2 to 2.5 $\times 10^{-2}$ Pa |
| Substrate surface temperature | 50 to 100° C. |
| Substrate rotation rate | 20 to 60 RPM |

Under the above conditions various magnetic films having Fe as their main component were formed on glass substrate using various targets on which surfaces various materials shown in Table 3 were fixedly mounted. The concentration of an element contained in each magnetic film thus formed was measured by an inductively coupled Ar plasma spectroscopy and an Auger electron spectroscopy. The magnetic characteristics of each magnetic film were measured after heat process under 300° C.; the saturation magnetic flux density by a vibrating sample magnetometer, the relative permeability by a vector impedance meter, and the coercivity by an B-H curve tracer.

Figure 2:
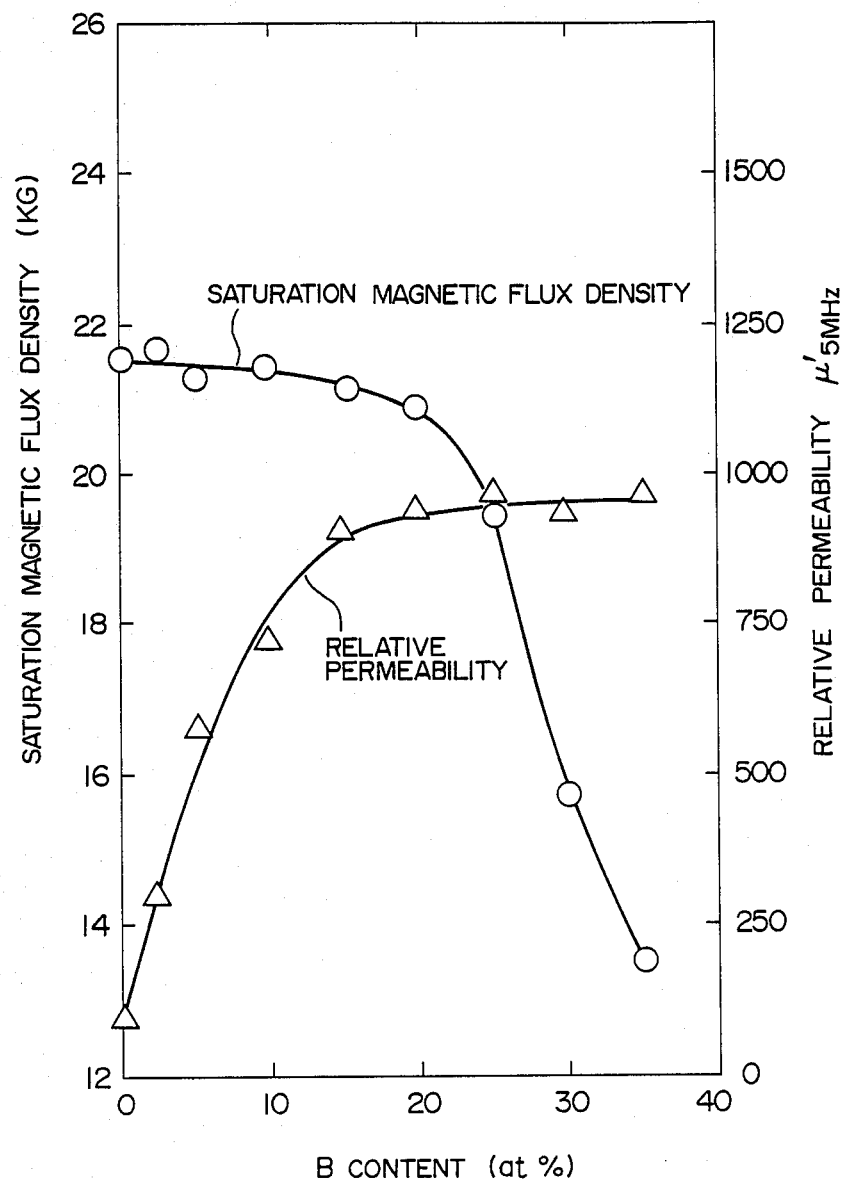
FIG. 2 is a graph showing the influence of B content upon the saturation magnetic flux density and relative permeability of a magnetic film according to an embodiment of the present invention.

The measurement results are shown in Table 3. The change in saturation magnetic flux density and relative permeability of the magnetic film added with B is shown in FIG. 2. As apparent from FIG. 2, there is a tendency that as the B content increases, the relative permeability increases. With a B content no less than 5 at. %, the relative permeability exhibits a value no less than 500. There is also a tendency that as the B content increases, the saturation magnetic flux density decreases. With a B content no larger than 20 at. %, the saturation magnetic flux density exhibits a value no less than 20 KG. Namely, the B content is preferably 5 to 20 at. %.

The obtained Fe-B type magnetic films were observed by the X-ray diffraction method, indicating that as the B content increases, the Fe (110) diffraction peak becomes small and broad. The peak disappeared practically at the B content of 10 at. % and the magnetic film is amorphous from the standpoint of X-ray. From the observation of the cross section of the magnetic film by a transmission electron microscopy, it was found that the magnetic film is made of fine crystallites of which diameter cannot be observed clearly.

For the magnetic film added with another element, instead of B, interstitially soluble to Fe, it was also found that good values of the saturation magnetic flux density and the relative permeability are obtained in the range of 5 to 20 at. % content. It is to be noted that the additives shown in Table 3 were fixedy mounted on the Fe target during the ion beam sputtering, and that the additives are not contained in the magnetic film in the form of compound. The measurement results suggest that not only one element but also two or more elements may be added in interstitially soluble form.

EXAMPLE 4

An Fe rich target used in Example 3 was held by one of the target holders of an ion beam sputtering apparatus having rotary target holders. An Ni-19 wt. % Fe target or a Co-7 wt. % Zr target was held by another target holder. Under the sputtering conditions same as Example 3, a multilayered magnetic film was formed using as a main magnetic film the Fe type magnetic film of 950 angstroms and as an intermediate layer the Ni-19 wt. % Fe film or the Co-7 wt. % Zr film of 50 angstroms, and sequentially laminating them into 9 layers. The magnetic characteristics of the obtained multilayered magnetic films are shown in Table 4.

As seen from Table 4, the saturation magnetic flux density is no lower than 19 KG for all the films, and no dilution of the Fe magnetic moment occurred. The relative permeability for each magnetic film was considerably improved as compared with the results of Example 3 and exhibited a value no less than 1500. It can be considered that the columnar crystalline structure of a single layer magnetic film is finely divided into fine crystallites in the multilayered magnetic film to thereby increase the relative permeability. It was also found that the Ni-19 wt. % Fe (permalloy) or the Co-7 wt. % Zr (amorphous magnetic alloy) is advantageously used as an intermediate layer to increase the relative permeability without decreasing the saturation magnetic flux density.

By using the above single layer or multilayered magnetic film as a magnetic pole of a perpendicular or longitudinal magnetic recording head, a recording density no less than 100 KBPI (kilobit/inch) was obtained which is larger than 80 KBPI of the conventional magnetic film.

As described so far, the Fe-type magnetic film of this invention exhibits a high saturation magnetic flux density (no less than 19 KG) and a relative permeability no less than 500 for a single layer film and no less than 1500 for a multilayered film. As a result, even if a thin magnetic film about 0.2 micron is used as the magnetic pole of a magnetic recording head, magnetic saturation does not occur to thereby enable to generate high magnetic field at the tip of the magnetic pole and achieve high density magnetic recording.

Why the above effect of this invention is obtained is not still clear. However, it can be imagined that although even an element interstitially soluble to Fe is present in Fe, the element has the distinctive nature that the Fe magnetic moment is not diluted, and that the crystalline growth is prevented to accordingly form fine crystallites. It can be imagined that such nature results in an increase in the relative permeability.

TABLE 3

| No. | Additive | Content | Saturation magnetic flux density (KG) | Relative permeability (5 MHz) | Coercivity (Oe) |
| --- | --- | --- | --- | --- | --- |
| 1 | B | 0 at % | 21.5 | 90 | 12.3 |
| 2 |   | 2.5 | 21.7 | 310 | 7.7 |
| 3 |   | 5 | 21.3 | 580 | 5.2 |
| 4 | B | 10 | 21.4 | 720 | 4.6 |
| 5 |   | 15 | 21.1 | 910 | 4.3 |
| 6 |   | 20 | 20.9 | 940 | 3.8 |
| 7 |   | 25 | 19.5 | 960 | 4.2 |
| 8 |   | 7 | 21.2 | 580 | 4.7 |
| 9 | P | 11 | 20.9 | 660 | 3.9 |
| 10 |   | 15 | 20.6 | 810 | 3.6 |
| 11 |   | 19 | 20.1 | 780 | 4.2 |
| 12 |   | B 7 N 5 | 21.6 | 670 | 4.8 |
| 13 | BN | B 9 N 6 | 20.7 | 690 | 4.5 |
| 14 |   | B 12 N 8 | 20.5 | 820 | 3.8 |
| 15 |   | B 5 C 2 | 21.3 | 550 | 4.6 |
| 16 | $B_4C$ | B 8 C 2 | 21.0 | 680 | 4.5 |
| 17 |   | B 13 C 5 | 20.4 | 850 | 4.2 |
| 18 |   | B 4 P 5 | 21.4 | 720 | 4.2 |
| 19 | BP | B 8 P 7 | 20.7 | 940 | 3.3 |
| 20 |   | B 9 P 8 | 20.6 | 970 | 3.5 |

TABLE 4

| No. | Main magnetic film | Intermediate layer | Saturation magnetic flux density (KG) | Relative permeability (5 MHz) | Coercivity (Oe) |
| --- | --- | --- | --- | --- | --- |
| 1 | Fe-8 at % B | Ni-19 wt. % Fe | 21.6 | 2300 | 1.6 |
| 2 | Fe-8 at % B | Co-7 wt. % Zr | 21.3 | 2100 | 1.8 |
| 3 |   | Ni-19 wt. % Fe | 20.8 | 2700 | 1.4 |
| 4 | Fe-12 at % B | Co-7 wt. % Zr | 20.7 | 2400 | 1.5 |
| 5 |   | Ni-19 wt. % Fe | 20.5 | 2600 | 1.3 |
| 6 | Fe-16 at % B | Co-7 wt. % Zr | 20.3 | 2300 | 1.9 |
| 7 |   | Ni-19 wt. % Fe | 21.6 | 2200 | 2.3 |
| 8 | Fe-8 at % P | Co-7 wt. % Zr | 20.8 | 2500 | 2.4 |
| 9 |   | Ni-19 wt. % Fe | 19.4 | 2800 | 2.2 |
| 10 | Fe-12 at % P | Co-7 wt. % Zr | 19.5 | 2600 | 2.3 |
| 11 | Fe-8 at % B | Ni-19 wt. % Fe | 19.7 | 2300 | 1.9 |
| 12 | -7 at % N | Co-7 wt. % Zr | 19.9 | 1900 | 2.5 |
| 13 | Fe-10 at % B | Ni-19 wt. % Fe | 19.8 | 2400 | 1.8 |
| 14 | -9 at % N | Co-7 wt. % Zr | 19.2 | 2100 | 1.9 |
| 15 | Fe-8 at % B | Ni-19 wt. % Fe | 20.2 | 1900 | 2.5 |
| 16 | -2 at % C | Co-7 wt. % Zr | 20.5 | 1600 | 2.7 |
| 17 | Fe-6 at % B | Ni-19 wt. % Fe | 21.1 | 1800 | 2.6 |
| 18 | -6 at % C | Co-7 wt. % Zr | 20.7 | 1700 | 2.9 |
| 19 | Fe-8 at % B | Ni-19 wt. % Fe | 20.9 | 2400 | 2.1 |
| 20 | -8 at % P | Co-7 wt. % Zr | 20.4 | 2100 | 2.2 |

What is claimed is:

1. A magnetic film made of Fe or having Fe as its main component and containing 5–20 at. % of one or more elements selected from the group consisting of B, N, C and P which are interstitially soluble to Fe, said one or more elements being contained in said magnetic film in an interstitially soluble form.

2. A magnetic film according to claim 1, wherein said magnetic film consists essentially of Fe and 5–20 at. % of one or more elements selected from the group consisting of B, N, C and P which are interstitially soluble to Fe.

3. A magnetic film according to claim 1, wherein said magnetic film contains an amorphous portion.

4. A magnetic film according to claim 1, wherein said magnetic film is formed by sputtering.

5. A magnetic film according to claim 1, wherein said magnetic film is formed by sputtering a target made of Fe and at least one material selected from the group consisting of C, B, P, BN, $B_4C$ and BP.

6. A magnetic film according to claim 1, wherein said magnetic film is disposed on a substrate.

7. A magnetic film having main magnetic films and intermediate layers alternately laminated, each of said main magnetic films being made of Fe or having Fe as its main component and containing 5—20 at. % of one or more elements selected from the group consisting of B, N, C and P which are interstitially soluble to Fe, said one or more elements being conetained in said main magnetic films in an interstitially soluble form.

8. A magnetic film according to claim 7, wherein each of said intermediate layers is made of a Ni-Fe alloy.

9. A magnetic film according to claim 7, wherein each of said intermediate layers is made of an amorphous magnetic alloy.

10. A magnetic film according to claim 7, wherein each of said intermediate layers is made of a Co-Zr alloy.

11. A magnetic film according to claim 7, wherein each of said main magnetic films consists essentially of Fe and 5-20 at. % of one or more elements selected from the group consisting of B, N, C and P which are interstitially soluble to Fe.

12. A magnetic film according to claim 7, wherein each of said main magnetic films contains an amorphous portion.

13. A magnetic film according to claim 7, wherein each of said main magnetic films is formed by sputtering.

14. A magnetic film according to claim 7, wherein each of said main magnetic films is formed by sputtering a target made of Fe and at least one material selected from the group consisting of C, B, P, BN, $B_4C$ and BP.

15. A magnetic film according to claim 7, wherein each of said main magnetic films is disposed on a substrate.

16. A magnetic head having a magnetic pole, at least a portion of said magnetic pole comprising a magnetic film made of Fe of having Fe as its main component and containing 5-20 at. % of one or more elements selected from the group consisting of B, N, C and P which are interstitially soluble to Fe, said one or more elements being contained in said magnetic film being in the form of an interstitially soluble form.

17. A magnetic head according to claim 16, wherein said magnetic film consists essentially of Fe and 5-20 at. % of one or more elements selected from the group consisting of B, N, C and P which are interstitially soluble to Fe.

18. A magnetic head according to claim 16, wherein said magnetic film contains an amorphous portion.

19. A magnetic head according to claim 16, wherein said magnetic film is formed by sputtering.

20. A magnetic head according to claim 16, wherein said magnetic film is formed by sputtering a target made of Fe and at least one material selected from the group consisting of C, B, P, BN, $B_4C$ and BP.

21. A magnetic head having a magnetic pole, at least a portion of said magnetic pole comprising a magnetic film, said magnetic film including main magnetic films and intermediate layers alternately laminated, each of said main magnetic films being made of Fe or having Fe as its main component and containing 5-20 at. % of one or more elements selected from the group consisting of B, N, C and P which are interstitially soluble to Fe, said one or more elements being contained in said main magnetic films in an interstitially soluble form.

22. A magnetic head according to claim 21, wherein each of said intermediate layers is made of a Ni-Fe alloy.

23. A magnetic head according to claim 21, wherein each of said intermediate layers is made of an amorphous magnetic alloy.

24. A magnetic head according to claim 21, wherein each of said intermediate layers is made of a Co-Zr alloy.

25. A magnetic head according to claim 21, wherein each of said main magnetic films consists essentially of Fe and 5-20 at. % of one or more elements selected from the group consisting of B, N, C and P which are interstitially soluble to Fe.

26. A magnetic head according to claim 21, wherein each of said main magnetic films contains an amorphous portion.

27. A magnetic head according to claim 21, wherein each of said magnetic films is formed by sputtering.

28. A magnetic head according to claim 21, wherein each of said main magnetic films is formed by sputtering a target made of Fe and at least one material selected from the group consisting of C, B, P, BN, $B_4C$ and BP.

* * * * *